Aug. 31, 1954    G. FERGUSON ET AL    2,687,921
BRAKE CYLINDER RELEASE VALVE DEVICE
Filed Sept. 3, 1952
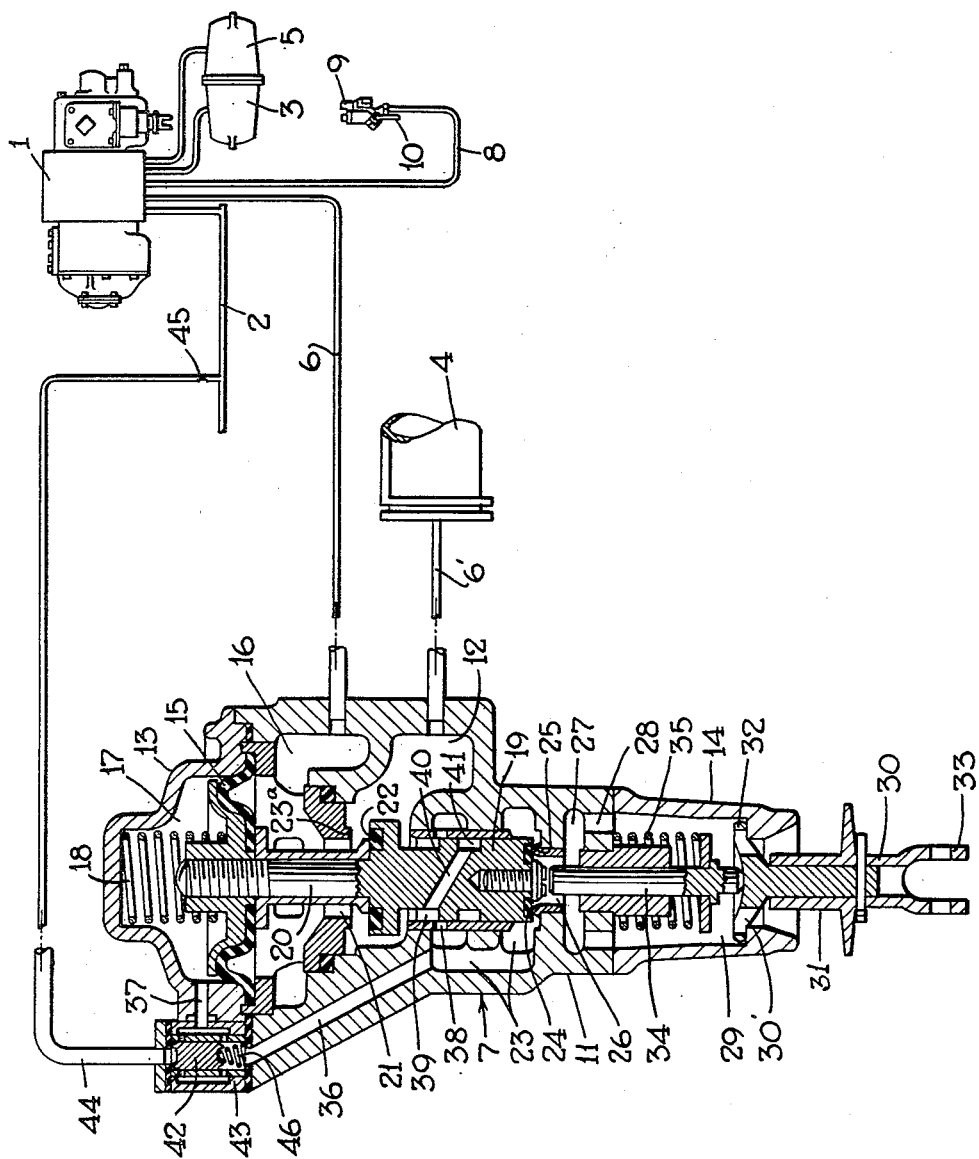
INVENTOR.
George Ferguson
Paul V. Pringle
BY
Adelbert A. Steinmiller
ATTORNEY Patented Aug. 31, 1954

2,687,921

UNITED STATES PATENT OFFICE 2,687,921

BRAKE CYLINDER RELEASE VALVE DEVICE

George Ferguson and Paul V. Pringle, Pittsburgh, Pa., assignors to Westinghouse Air Brake Company, Wilmerding, Pa., a corporation of Pennsylvania Application September 3, 1952, Serial No. 307,584

4 Claims. (Cl. 303—68)

This invention relates to automatic fluid pressure brake apparatus, such as the AB type, for railway vehicles, and more particularly to manually operative brake cylinder pressure release valve means for releasing the brakes on a vehicle, when the brake pipe is completely vented, without losing the fluid under pressure still remaining in the usual auxiliary reservoir or said reservoir and the usual emergency reservoir.

One such release valve means which is very useful in switching operation of a vehicle is disclosed in U. S. Patent 2,392,185 issued on January 1, 1946, to L. I. Pickert. This release valve means is interposed in the usual brake cylinder pipe connecting the AB valve to the brake cylinder device and resetting of said valve means to permit control of brakes on a vehicle by the AB valve, after manual brake cylinder releasing operation, is dependent upon substantial complete release of fluid under pressure from the portion of the brake cylinder pipe connected to the AB valve by movement of said AB valve to release position in response to increase in pressure in the usual brake pipe. If the usual pressure retaining valve device on a vehicle is turned up to hold a certain pressure in the brake cylinder device during descent of a grade, and one or more brake cylinder release valve means has been operated to release the brakes on respective vehicles to, for example, get a stalled train started, said retaining valve devices will hold sufficient pressure in the portion of the brake cylinder pipes connected to the AB valves on those vehicles to prevent resetting of the release valve means, so that the brakes on said vehicles will undesirably remain cut out or in released condition during the remainder of the descent and/or until the respective pressure retaining valve devices are returned to normal position for completely venting the connected brake cylinder pipes. This is undesirable and could result in a dangerous condition and one object of the invention is the provision of an improved brake cylinder release means so constructed as to automatically avoid the occurrence of such a condition.

Another object of the invention is to obviate the above undesirable condition by a relatively simple modification of the release valve means disclosed in the above referred to Pickert patent.

Other objects and advantages will become apparent from the following more detailed description of the invention.

In the accompanying drawing, the single figure is a diagrammatic view of a fluid pressure brake apparatus embodying the invention.

Description

As shown in the drawing, the fluid pressure brake apparatus may comprise a brake controlling valve device such as an AB valve 1 adapted to operate upon a service reduction in pressure in a brake pipe 2 to supply fluid under pressure from an auxiliary reservoir 3 to a brake cylinder device 4 for effecting a service application of brakes on a vehicle or upon an emergency reduction in pressure in said brake pipe to supply fluid under pressure from said reservoir and also from an emergency reservoir 5 to said brake cylinder device to effect an emergency application of brakes. This flow of fluid under pressure from the AB valve 1 to the brake cylinder device 4 occurs via the usual brake cylinder pipe 6 connected to said AB valve and 6' connected to said brake cylinder device, communication between pipes 6, 6' being controlled by a brake cylinder release valve device 7 embodying the invention and which will be later described.

Upon restoring pressure of fluid in the brake pipe 2, the AB valve 1 will operate in the usual manner to connect the brake cylinder pipe 6 to a retainer pipe 8 connected to a pressure retaining valve device 9 of usual structure, whereby with a handle 10 of said device in normal non-holding position a complete release of fluid under pressure from the brake cylinder device 4 will occur. If handle 10 is in a holding position then fluid under pressure will be released from the brake cylinder pipe 6 and normally from the brake cylinder device 4 until the pressure of such fluid is reduced to a certain chosen degree which it is desired to hold in said brake cylinder device while cycling brakes during descent of a grade. The structure and operation of the parts of the brake apparatus so far described are so well known that further detailing thereof is not deemed essential in the present application.

The brake cylinder release valve device 7 comprises a central casing section 11 having a chamber 12 to which pipe 6' is open, a cover 13 secured to the top of said casing section and a lever support portion 14 secured to the bottom of said casing section. A movable abutment in the form of a flexible diaphragm 15 clamped around its edge between the casing section 11 and cover 13 cooperates with the former to provide a chamber 16 therein which is open to the brake cylinder pipe 6. At the opposite side of diaphragm 15, within cover 13, is a chamber 17 containing a light bias spring 18 acting on said diaphragm urging it downwardly.

A piston valve 19 arranged in coaxial relation to diaphragm 15 and slidably mounted in a bore in the casing section 11 is connected by a stem 20 to the center of diaphragm 15 for movement thereby and therewith. The stem 20 extends through an opening 21 provided in a partition wall separating chambers 12 and 16 and associated with the upper end of the piston valve 19 is a poppet type valve 22 arranged to engage a seat 23a provided on said wall around said opening for closing communication through said opening between chambers 12 and 16. The lower end of the piston valve 19 is disposed in a chamber 23 and therein carries a valve 24 arranged to cooperate with a seat 25 for controlling communication between said chamber and a passage 26 which is open to atmosphere via cavity 27 and ports 28 in the casing section 11 and a chamber 29 and ports 30 in the lever support portion 14, the ports 30 being provided in a lever element 31 comprising a disc 32 rockably supported in said portion around its edge and a lever 33 secured to and depending from said disc for manual operation. A pin 34 slidably mounted in a bore in the casing section 11 in coaxial relation with the lower end of piston valve 19 has one end arranged to engage said piston valve while its opposite end is urged constantly by a spring 35 against the disc 32. Chamber 23 is open to a passage 36 adapted normally to be connected by a passage 37 to chamber 17.

The structure so far described may be identical to that in the Pickert patent above mentioned and its operation is as follows:

Assume that the retaining valve handle 10 is turned down whereby the retainer pipe 8 will be completely vented. Further assume that the AB valve 1 is in its brake release position opening pipe 6 to pipe 8 whereby pipe 6 and chamber 16 in the release valve device 7 will both be at atmospheric pressure. With chamber 16 thus vented spring 18 will deflect diaphragm 15 to unseat valve 22 and seat valve 24. With valve 22 open pipe 6' and the brake cylinder device 4 will both be vented via chamber 16 and pipe 6, and chamber 17 above diaphragm 15 will also be vented via passages 37, 36, chamber 23, a casing port 38 and an annular passage 39 in the piston valve 19, said passage establishing communication between port 38 and chamber 12.

If, in response to a reduction in pressure in brake pipe 2, the AB valve operates to supply fluid under pressure to the brake cylinder pipe 6 from the auxiliary reservoir 3 or from both said reservoir and the emergency reservoir 5, such fluid under pressure will flow into chamber 16 and thence past the open valve 22 to chamber 12 and through pipe 6' to the brake cylinder device 4 and effect an application of brakes. When fluid under pressure is thus supplied to chamber 16 it will act upwardly on diaphragm 15 and the pressure obtained at substantially the same time in chamber 12 will act downwardly on the piston valve 19 to hold the valve 24 seated. Also as fluid under pressure is supplied chamber 12, the pressure of such fluid will equalize through the annual passage 39 in the piston valve 19 and the casing port 38 into chamber 23 and thence through passages 36 and 37 into chamber 17. The pressure of fluid thus obtained in chamber 17 plus that of spring 18 will hold the diaphragm 15 in the position in which it is shown in the drawing upon supply of fluid under pressure to chamber 16 whereby the valve 22 will remain open connecting the brake cylinder device 4 to the AB valve 1 to permit application of brakes as above mentioned.

If while the brakes on the vehicle are applied by fluid under pressure in the brake cylinder device 4 with the brake pipe completely vented, and the AB valve in service or emergency position opening either the auxiliary reservoir 3 or both said reservoir and the emergency reservoir 5 to the brake cylinder pipe 6, it is desired to release said brakes without dissipating the fluid under pressure still present in said auxiliary reservoir or in both of said reservoirs, a trainman may push or pull on the lever element 30 to actuate pin 34 against the valve 24 and then unseat said valve from its seat 25. A slight unseating movement of valve 24 will open a vent from chamber 23 past said valve to atmosphere of greater flow capacity than the communication via annular groove 39 in the piston valve 19 and the casing port 38 through which said chamber is supplied with fluid under pressure from chamber 12, as a result of which, the pressure of fluid in chamber 23 and the connected diaphragm chamber 17 will be suddenly reduced past the valve 24 to such an extent that pressure of fluid in chamber 16 will deflect diaphragm 15 against spring 18 and seat valve 22 and fully open valve 24. The seating of valve 22 closes communication between chambers 16 and 12, while with valve 24 fully open the brake cylinder device 4 will be vented to atmosphere via chamber 12, the annular passage 39, a diagonal passage 40 and another annular passage 41 in the piston valve, the casing port 38, chamber 23 and past the fully open valve 24. A release of brakes on the vehicle will thus occur, while the seated valve 22 will hold the fluid under pressure still remaining in the auxiliary reservoir 3 or both said reservoir and the emergency reservoir 5 and the connected pipe 6 and chamber 16.

Upon restoring pressure of fluid in the brake pipe 2, the AB valve 1 will return to its release position for opening pipe 6 to the retainer pipe 8. If the handle 10 of the retaining valve device 9 is in normal turned down position, the pipe 6 and chamber 16 will be completely vented to atmospheric pressure, but if turned up to a holding position, such pressure will merely reduce to the setting of the retaining valve device. If the pressure of fluid in pipe 6 and chamber 16 is thus reduced to substantially atmospheric pressure, spring 18 will reopen valve 22 and close valve 24 whereby the release valve device 7 will be automatically conditioned to permit application of brakes upon operation of the AB valve 1 in response to a subsequent reduction in pressure in brake pipe 2. However, if the retainer handle is turned up so as to hold a chosen pressure in the brake cylinder pipe 6 and chamber 16, such pressure acting on diaphragm 15 will maintain said diaphragm deflected against spring 18 holding valve 22 seated and valve 24 open thus maintaining the brake cylinder device 4 vented to atmosphere past the latter valve. Under this latter condition, it will be obvious that if by subsequent operation of the AB valve fluid under pressure is supplied to the brake cylinder pipe 6 and chamber 16 to apply the brakes on the vehicle, such pressure acting on diaphragm 15 will merely hold the valve 22 seated and the valve 24 open whereby the brake cylinder device 4 will remain vented and the brakes undesirably released.

Whenever the brake pipe 2 is charged or recharged with fluid under pressure it is desirable that the release valve device 7 always automatically reset to normal position to ensure control of brakes by the AB valve and to this end, according to the invention, there is added to said device a double check valve 42. The double check valve 42 is preferably associated with cover 13 in a casing 43 removably attached to said cover, said casing having a side outlet registering with passage 37 and opposite end connections for the double check valve registering, respectively, with passage 36 and a pipe 44, the pipe 44 being connected through a choke 45 to brake pipe 2. The check valve 42 is thus arranged to open passage 37 and thereby chamber 17 to either passage 36 or brake pipe 2 while closing communication between passage 37 and brake pipe 2 or passage 36, respectively. A light bias spring 46 acts on the double check valve 42 to ensure it moving to its upper position to close communication between brake pipe 2 and passage 37 and to open passage 37 to passage 36 whenever the brake pipe 2 is substantially completely vented in order that the release valve device will operate as hereinbefore described when the brake pipe 2 is substantially completely vented. If the release valve device 7 is in the position with valve 24 open, venting the brake cylinder device 4 and handle 10 of the pressure retaining valve device 9 is turned to holding position with the brake pipe 2 completely vented, it will be seen that when the brake pipe 2 is recharged with fluid under pressure, such fluid will shift the double check valve 42 to its lower position and become effective through passage 37 in chamber 17 above the diaphragm 15. This pressure of fluid in chamber 17 plus the pressure of spring 18 will then deflect diaphragm 15 downward against pressure of fluid retained in chamber 16 by the retaining valve device 9 thus automatically resetting the release valve device to ensure application of brakes upon a subsequent reduction in brake pipe pressure.

If a train is stalled on a grade due to an excessive service application of brakes, brake pipe pressure will be effective in chamber 17 as will be apparent. By operation of the lever element 30 a trainman may release the brakes on any vehicle however against brake pipe pressure in chamber 17, but upon release of said lever element such pressure in chamber 17 will immediately reset the release valve device to ensure control of the brakes on the vehicle by subsequent operation of the AB valve.

The choke 45 located as close as possible to brake pipe 2 is of a minimum practical size and its purpose is to so delay change in pressure in pipe 44, which is as short as possible, and in chamber 17 as not to materially effect or delay the usual rate of change in pressure in the brake pipe 2 necessary to properly control the brakes on a train.

*Summary*

It will now be seen that by the relatively simple addition of the double check valve 42 to the Pickert brake cylinder release valve device, automatic resetting of said device is obtained by brake pipe pressure to ensure braking of a vehicle after manual operation to release the brakes on the vehicle.

Having now described my invention, what I claim as new and desire to secure by Letters Patent, is:

1. In combination, a brake pipe, a brake release valve device having a first chamber for receiving fluid under pressure from a brake pipe controlled brake controlling valve device and having a second chamber to which fluid under pressure is adapted to flow from said first chamber for effecting application of brakes and comprising movable abutment means subject to pressure of fluid in said first chamber acting in opposition to pressure of fluid in a third chamber, valve means connected to said abutment means for movement therewith and having one position for establishing communication between said first and second chambers and a fourth chamber and movable manually to a second position to disconnect said first chamber from said second and fourth chambers and to open said second and fourth chambers to atmosphere, pressure exerting means biasing said valve means toward said one position, and a double check valve subject opposingly to pressures of fluid in said brake pipe and fourth chamber operative to open said third chamber to either said brake pipe or fourth chamber whichever is supplied with fluid at the greater pressure.

2. In combination, a brake pipe, a brake release valve device having a first chamber for receiving fluid under pressure from a brake pipe controlled brake controlling valve device and having a second chamber to which fluid under pressure is adapted to flow from said first chamber for effecting application of brakes and comprising movable abutment means subject to pressure of fluid in said first chamber acting in opposition to pressure of fluid in a third chamber, valve means connected to said abutment means for movement therewith and having one position for establishing communication between said first and second chambers and a fourth chamber and movable manually to a second position to disconnect said first chamber from said second and fourth chambers and to open said second and fourth chambers to atmosphere, pressure exerting means biasing said valve means toward said one position, a spring, and a double check valve subject on one end to pressure of fluid in said brake pipe and on the opposite end to pressure of said spring plus pressure of fluid in said fourth chamber and operative selectively to open said third chamber to the end of said double check valve which is subject to the greater pressure.

3. In a fluid pressure brake apparatus, the combination with a brake pipe, of a brake cylinder pipe, a brake cylinder device connected to said brake cylinder pipe, a brake controlling valve device operative upon a reduction in brake pipe pressure to supply fluid under pressure through said brake cylinder pipe to said brake cylinder device to effect an application of brakes and upon supply of fluid under pressure to said brake pipe to open said brake cylinder pipe to an exhaust connection for releasing fluid under pressure from said brake cylinder device to effect a release of brakes, a pressure retaining valve device connected to said exhaust connection having a position in which it limits exhaust of fluid under pressure from said brake cylinder device, a release valve interposed in said brake cylinder pipe having a normal position in which it opens communication through said pipe and movable manually to an abnormal position for closing said communication and for venting fluid under pressure from said brake cylinder device, movable abutment means subject in a first chamber to pressure of fluid supplied to said brake cylinder pipe by said brake controlling valve device and operative by opposing pressure of fluid in a second chamber to urge said valve means to said normal position, said release valve in said normal position establishing a communication for flow of fluid under pressure from said first chamber to said second chamber, and valve means operative upon a preponderance in pressure in said brake pipe over that in said communication to close said communication and open said second chamber to said brake pipe.

4. In combination, a brake pipe, a brake release valve device comprising a casing section having a first chamber for receiving fluid under pressure from a brake controlling valve device and having a second chamber to which such fluid under pressure is adapted to flow from said first chamber for effecting an application of brakes, a movable abutment, one side of which defines one wall of said first chamber, a cover secured to said casing section cooperative with said abutment to define at the opposite side of said abutment a third chamber, valve means connected to said movable abutment for movement therewith and having one position for establishing communication between said first and second chambers and a fourth chamber and movable manually against pressure of fluid in said third chamber to close said communication and for establishing another communication for releasing fluid under pressure from said second and fourth chambers, and a double check valve associated with said cover subject on one end to pressure of fluid in said fourth chamber and on the opposite end to opposing pressure of fluid in said brake pipe and operative to open said third chamber to the greater one of such opposing pressures.

References Cited in the file of this patent

UNITED STATES PATENTS

| Number | Name | Date |
|---|---|---|
| 2,287,775 | Baker et al. | Jan. 30, 1942 |
| 2,392,185 | Pickert | Jan. 1, 1946 |
| 2,444,993 | Klein | July 13, 1948 |